Feb. 23, 1965     G. T. JOHNSON ETAL     3,170,296
MANUAL AND MOTOR DRIVE APPARATUS FOR HYDRAULIC MOTOR
Filed March 18, 1963                     2 Sheets-Sheet 1

INVENTORS
GEORGE T. JOHNSON &
LLOYD R. MAWHORR
BY Hamilton & Cook
ATTORNEYS

INVENTORS
GEORGE T. JOHNSON &
LLOYD R. MAWHORR
BY Hamilton & Cook
ATTORNEYS 3,170,296
MANUAL AND MOTOR DRIVE APPARATUS FOR HYDRAULIC MOTOR
George T. Johnson and Lloyd R. Mawhorr, Mansfield, Ohio, assignors to Shafer Valve Company, Mansfield, Ohio, a corporation of Ohio
Filed Mar. 18, 1963, Ser. No. 265,791
5 Claims. (Cl. 60—52)

The present invention relates generally to apparatus for actuating hydraulic motors or other devices. More particularly, the invention relates to apparatus for actuating hydraulic valve operators for pipe line valves. Specifically, the invention relates to apparatus for selectively actuating valve operators by manual or power driven pump.

Pipe line systems in gas line stations, oil fields, refineries, power plants, chemical plants, and other installations often involve exceedingly elaborate and complex routing and branch circuitry requiring extensive valving for dispatching and controlling flows in the system. Such systems require a multiplicity of globe and gate valves, and other similar flow devices. Formerly, these valves were manually operated; but, owing to the laborious effort required to operate such valves and the associated excess costs involved in maintaining a crew of personnel of sufficient number to supervise and operate such systems, the systems have been largely converted over to motor or power operated valves, locally controlled and supplied with power or hydraulic fluid from a central source. Centralized, network hydraulic systems of this type require excessive hydraulic piping and local control elements, and in large pipe line systems the costs of initial installation, maintenance, and supervision were prohibitive. Therefore, many large scale pipe line systems employed decentralized systems of local substations. However, although the complexity and costs of valve control were thereby reduced, maintenance and supervision problems persisted.

More recently, with the advent of telemetry, central computor control and other forms of electrical and electronic automation, it has become possible to optimize the operation of large pipe line systems. However, the cost of automating such systems is greatly increased if facilities for monitoring maintenance failures of the mechanical elements, such as hydraulic leaks and overloads, are required.

Automation of all of the prior art systems and devices of which applicant is aware requires such monitoring or superintendence because of the necessity for excessive external hydraulic piping and connections, and the absence of fail-safe devices. Moreover, devices proposed in attempting to solve these problems have proven impractical due to their high manufacturing costs.

It is, therefore, an object of the present invention to provide a simple, inexpensive apparatus for actuating valve operators in a pipe line system.

It is a further object of the invention to provide combination manual and motor drive apparatus for a hydraulic valve operator, requiring no external piping connections and having fail-safe features.

It is a still further object of the invention to provide apparatus of the character described affording ease of maintenance and service.

It is an even further object of the invention to provide manual and motor drive apparatus for selectively operating a hydraulic motor having pressure and exhaust connections comprising, a casing having first and second ends and adapted to contain a fluid reservoir, a reversible power-driven pump carried on said first end of said casing, manifold means having an integral hand-driven piston pump mounted on and forming said second end of said casing and having fluid outlet means adapted for connection to a hydraulic motor, operatively connected check and multi-way valve means within said casing in operative communication with said reservoir, said check and multi-way valve means being hydraulically connected with said power-driven pump and said manifold means, and selectively positionable porting means within said multi-way valve means whereby said hydraulic motor may be selectively connected with said power-driven pump and said hand-driven pump and whereby said hydraulic motor may be selectively reversed.

These and other objects of the present invention will become apparent upon reference to the description of the preferred embodiment in the following specification, it being understood that the invention is to be measured solely by the scope of the appended claims.

One preferred embodiment of a manual and motor drive pumping apparatus for selectively operating a hydraulic motor having pressure and exhaust connections is shown, by way of example, in the accompanying drawings as being adapted for operation of a rotary hydraulic motor which, in turn, operates a rotary valve in a pipe line, it being understood that piston gate valve operators and other similar devices could likewise be operated by apparatus according to the present invention.

Figure 1:
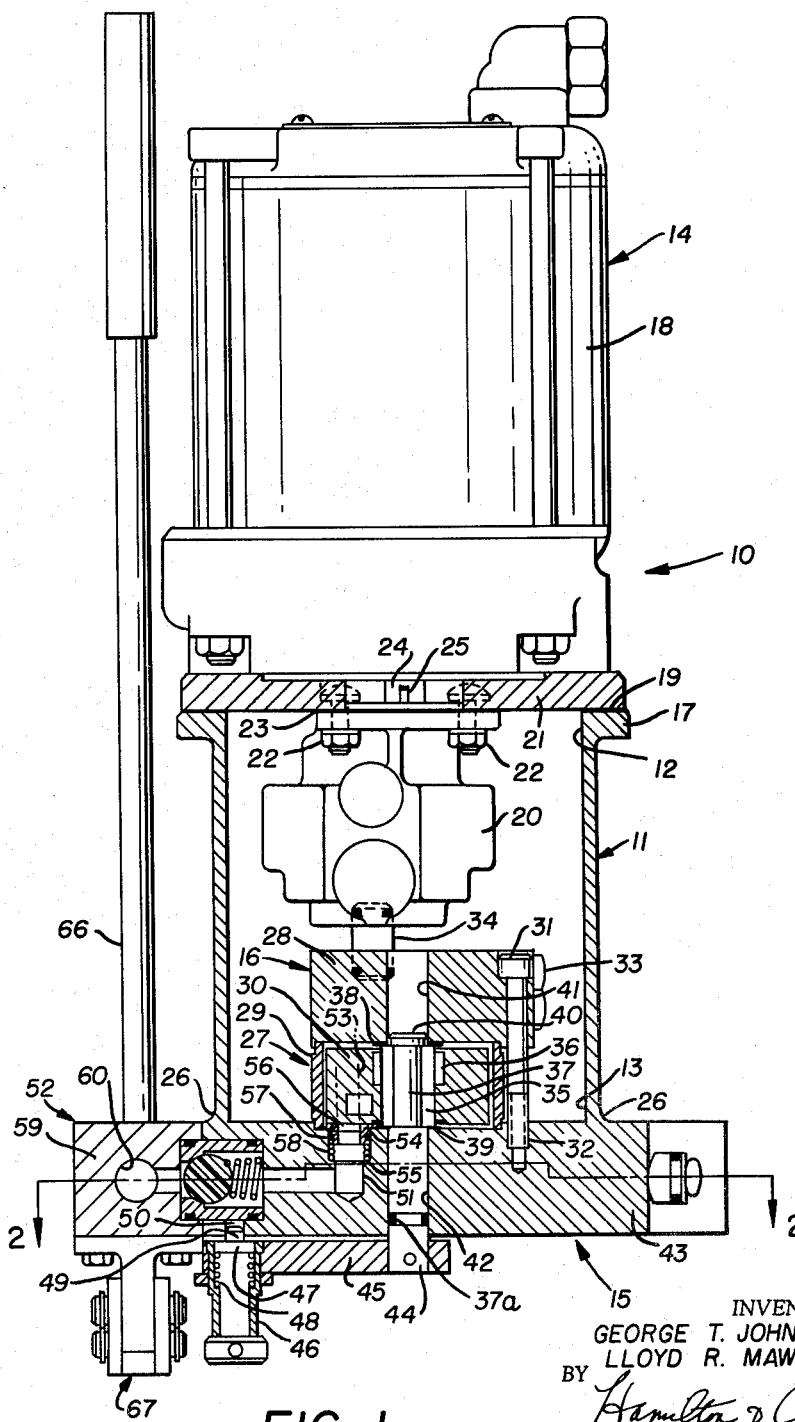
FIG. 1 is an elevational assembly view, partially in section, of an improved manual and motor drive hydraulic apparatus according to the present invention.

Referring to FIG. 1, the invention, which may be characterized as integral electro-manual hydraulic pump apparatus, is indicated generally in the preferred form by the numeral 10. The apparatus 10 comprises a fluid reservoir casing 11 having a first open end 12 and a second open end 13, a power-driven reversible pump assembly 14 carried on and enclosing the first end 12 of the casing 11, a manifold and hand pump assembly 15 mounted on and enclosing the second end 13 of the casing 11, and a combination check and selector valve assembly 16 within the casing 11 and adapted to be immersed in operative communication with the fluid reservoir contained therein, the valve assembly 16 being operatively connected to the reversible pump assembly and operatively mounted on the manifold and hand pump assembly.

The fluid reservoir casing 11 is a circumferentially tubular or cylindrical vessel having a first, or upper, open end 12 and a second, or lower, open end 13 and being composed of steel or other suitable material. The upper end 12 of the casing 11 is preferably formed with an outturned motor mounting flange 17 to which a flange mounting electric motor 18 is bolted or mounted in a liquid-tight manner by motor gasket 19 to enclose the upper end 12 of the fluid reservoir 11.

A reversible pump 20, having pressure and suction outlets, is mounted to the under side of the motor flange 21 as by bolts 22 and pump gasket 23, and is thus disposed within the casing 11. The rotor or impeller of the pump 20 is keyed to the shaft 24 of the motor 18, as indicated at 25.

Although the preferred embodiment of the invention contemplates utilization of an A.C. electric motor, other types of power sources may be employed if desired. For instance, D.C. electric, air, steam, or combustion types might be used. The type of power source to be used will be determined wholly by extrinsic factors such as remote control requirements and relative economies of motor installation and operation.

The second, or lower, open end 13 of the fluid reservoir casing 11 is enclosed by the manifold and hand pump assembly 15 which is secured to the casing 11 in a fluid-tight manner by the continuous circumferential weld 26. The manifold and hand pump assembly 15, which has structural and operational features hereinafter more fully described with reference to FIGS. 2–5, may be of any suitable material. Operatively mounted thereon and disposed within the casing is a combination check and selector valve assembly 16, the assembly shown as being centrally located within the casing 11 with its axis of symmetry corresponding with the axis of the cylindrical casing 11. The elevational sectional view of the assembly illustrated in FIG. 1 is taken by passing a plane through the axis of the cylindrical casing 11, thereby bisecting the substantially symmetrical structure of the valve assembly 16.

The combination check and selector valve assembly 16 is shown as including a rotary selector or multi-way valve assembly 27 and a two-valve check valve block 28 operatively mounted thereon enclosing an end of the cylindrical housing 29 for the rotary multi-way valve block 30. The check valve block 28 is secured by hold-down bolts 31 registering in threaded bores 32 in the manifold and hand pump assembly 15.

The check valve block 28 embodies conventional check valve and conduit bore means for unidirectional flow of hydraulic liquid through the open inlets in communication with the fluid reservoir in casing 11 (one of which is indicated at 33), through the conduit bore means in the block 28, through the nipple pump connector or conduit 34 to the suction side of the pump 20, through the pump to the pressure side thereof, through a nipple connector or conduit (not shown in the bisected section view of FIG. 1, but identical with the pump connector 34 shown), through separate and second conduit bore means in block 28, to a port operatively communicable with selective porting in rotary multi-way valve block 30. The exact structural features of the check valve block per se form no part of the present invention and need not be shown in further detail, the required operation and results being illustrated and described below with reference to the schematic hydraulic circuitry of FIGS. 3–5, in sufficient degree to furnish instruction to one skilled in the art.

Disposed beneath the check valve block 28 and within the cylindrical housing 29 is a rotary multi-way valve block 30 which may be of generally toroidal or disk shape. The multi-way valve block or disk 30 is secured by splines or keys 36 to a selector shaft 37. The axial ends of the spline portion of the shaft are sealed for rotation by upper and lower washers 38 and 39, respectively, which are preferably Teflon. The selector shaft 37 extends downwardly from its upper cap end 40, which is rotatably fit in bore 41 of check valve block 28, through bore 42 in the manifold block 43 of manifold and hand pump assembly 15, and terminates in a crank arm joint portion 44 beneath the manifold block 43. The multi-way valve block or disk 30 is thus rotatable with the selector shaft 37, the shaft O-ring 37a providing a seal against leakage of hydraulic fluid.

A crank arm 45 is secured to the selector shaft 37 at the joint portion 44 and extends radially outwardly therefrom to a hollow handle or knob 46. A lock pin 47 is carried within the hollow knob and is urged against the under surface of the manifold block 43 by a spring 48, the pin protuberance 49 being selectively registrable with index slots 50 located at predetermined circumferential intervals on the lower face of the manifold block 43. The location of the index slots 50 would correspond to selective orientations of the multi-way valve block or disk 30 and the conduit boring and porting associated therewith. The multi-way valve block 30 is bored and ported in a well-known manner to provide the selective operational connections described below with reference to the hydraulic circuitry shown in FIGS. 3–5. In the preferred embodiment, the boring and porting of valve block 30 is that of a three-way rotary valve providing for motor operation, forward hand pump operation, and reverse hand pump operation.

The operative communication of the ports of multi-way valve block or disk 30 with ports in the manifold block 43 is illustrated, by way of example, in FIG. 1 wherein the pressure port 51 from the hand pump 52 of the manifold and hand pump assembly 15 is shown disposed in the manifold block 43 in operative relation to a port, indicated generally in phantom at 53, within the multi-way valve block or disk 30. The upper end of the port 51, which is adjacent the valve block 30, has a coaxially countersunk portion formed by a bore 54 of larger diameter than that of the port 51, thereby forming a shoulder 55. A bushing 56 is inserted in bore 54 and maintained in sealing relation by O-ring 57. The bushing is urged into operative communication with the under side of the multi-way valve disk 30 by a coiled spring 58 biased against shoulder 55. In a similar manner, other ports in the manifold block 43 are maintained in selective operative communication with the rotary multi-way valve disk 30.

Figure 2:
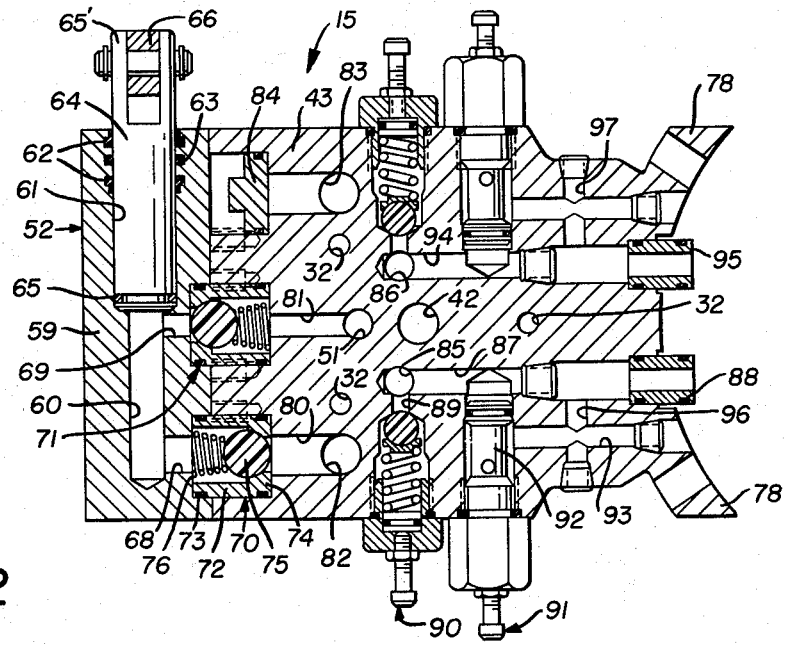
FIG. 2 is a cross-sectional view, taken on line 2—2 in FIG. 1, illustrating the conduit boring and porting of the manifold block and the hand actuated piston pump integral therewith.

Referring now to the section view of FIG. 2, the hand pump and manifold assembly 15 is shown as comprising a manifold block 43 with a hand pump 52 integrally attached thereto. The hand pump 52 is made up of a pump block 59 having coaxial bores 60 and 61, forming a well and cylinder, respectively, with bore 61 of larger diameter than bore 60. The cylinder formed by bore 61 carries wiper rings 62 and an O-ring 63 for fluid-tight reception of a piston 64 which also has a felt wiper 65 near its head. The cylinder 64 also has an outer end forming a clevis portion 65 to which a handle 66 is attached for reciprocation of the cylinder 64 by a conventional two-pivot idler crank arrangement (not shown, but indicated generally by the numeral 67 in FIG. 1).

The pump well formed by bore 60 communicates with inlet or suction port 68 and outlet or pressure port 69 in the pump block 59. The bores forming suction port 68 and pressure port 69 are spot-faced to receive ball-check assemblies 70 and 71, respectively, in liquid-tight, press-fit relation. Ball check assembly 70 is made up of a sleeve coupler 72 carrying O-ring seals 73 at both ends and having one end formed with a ball seat flange 74. A check ball 75 rides in seat flange 74 and is urged into sealing fit therewith by cyclone coiled spring 76 which is biased against the shoulder 77 formed by spot facing the bore forming suction port 68. The construction permits unidirectional flow of fluid through the assembly 70 into the port 68 during conditions wherein the negative pressure differential across the assembly 70 is sufficient to offset the spring bias. Reverse flow is checked by the cooperation of the ball 75 and seat flange 74. Hence, the assembly 70 permits ingress of fluid into pump well bore 60, but not egress. The construction and operation of ball check assembly 71 is identical except that it is oriented for egress of fluid from pump well bore 60, and not ingress.

The pump block 59 is attached to manifold block 43 by any suitable means, as, for example, bolting, clamping or spot welding. However, the mechanical connection is preferably made in such a manner that the assembly may be readily disconnected for maintenance and service purposes.

The manifold block 43, as shown in the section plan view of FIG. 2, is generally rectangular in outline with one end contoured and formed with mounting lug portions 78 for mounting on a hydraulic motor or valve operator. The relative orientation of the inner diameter of the cylindrical casing 11 (and, hence, the hydraulic reservoir) is indicated by the chain line circle designated 79;

while, relative location of the multi-way valve assembly 27 is indicated by the triangular spacing and orientation of holddown bolt bores 32 and selector shaft bore 42.

At the connection points of the manifold block 43 with the pump block 59, the ball check assemblies 70 and 71 are inserted in spot faced bores which form suction conduit 80 and pressure conduit 81, respectively. Suction conduit 80 terminates in an upwardly directed port 82 which is open and in direct operative communication with the fluid reservoir within casing 11; and pressure conduit 81 terminates in an upwardly directed port 51 for selective operative communication with the multi-way valve disk 30 in a manner previously discussed. A drainage duct 83, open to the fluid reservoir, is also provided; but access to the sealing plug 84 is precluded by the presence of the pump block 59. Hence, the pump block 59 must be removed for drainage of the fluid reservoir within casing 12. This feature is desirable because operation of the hand pump with an empty fluid reservoir would introduce air into the fluid or hydraulic system, necessitating troublesome "bleeding" of the lines and elements to evacuate the air.

Fluid motor inlet port 85 and exhaust port 86 are shown emerging upwardly from manifold block 43 for selective operative communication with multi-way valve disk 30 in a manner previously discussed with reference to hand pump pressure port 51. The lower end of motor inlet port 85 terminates in a laterally directed motor supply conduit 87 leading to a press-on connector 88 for hydraulic connection to the pressure side of a hydraulic motor or valve operator. Motor supply conduit 87 preferably has a first branch conduit extending therefrom to an adjustable spring-loaded pressure relief valve 90 which discharges into the fluid reservoir within casing 11 during conditions of excessive pressure. The motor supply conduit may also have inserted therein an adjustable pressure-actuated flow control valve 91 of the Waterman piston-operated orifice type wherein a piston 92 is actuated by pressure differential across this piston in the fluid pressure sensing conduit 93 which is connected into the working chamber of a hydraulic motor.

The motor exhaust port 86 and associated conduit boring and valving is identical with that of the motor pressure side of the manifold block and extends laterally through motor exhaust conduit 94 to a press-on connector 95 for hydraulic connection to the exhaust side of a hydraulic motor. In addition, the motor pressure conduit 87 and the motor exhaust conduit 94 are provided with branch feeder conduits 96 and 97, shown as being plugged, but adapted for connection of other hydraulic devices in parallel with the hydraulic motor or valve operator on which the apparatus 10 is mounted.

It will be understood that the motor pressure and exhaust sides of the manifold block 43 may be reversed in function by reversing the power driven pump 14 due to the symmetry of construction and identity of operation of the check valve 28 and the manifold block 43 when the selector or multi-way valve assembly 27 is set for automatic, or motor, operation.

Figures 3, 4, 5:
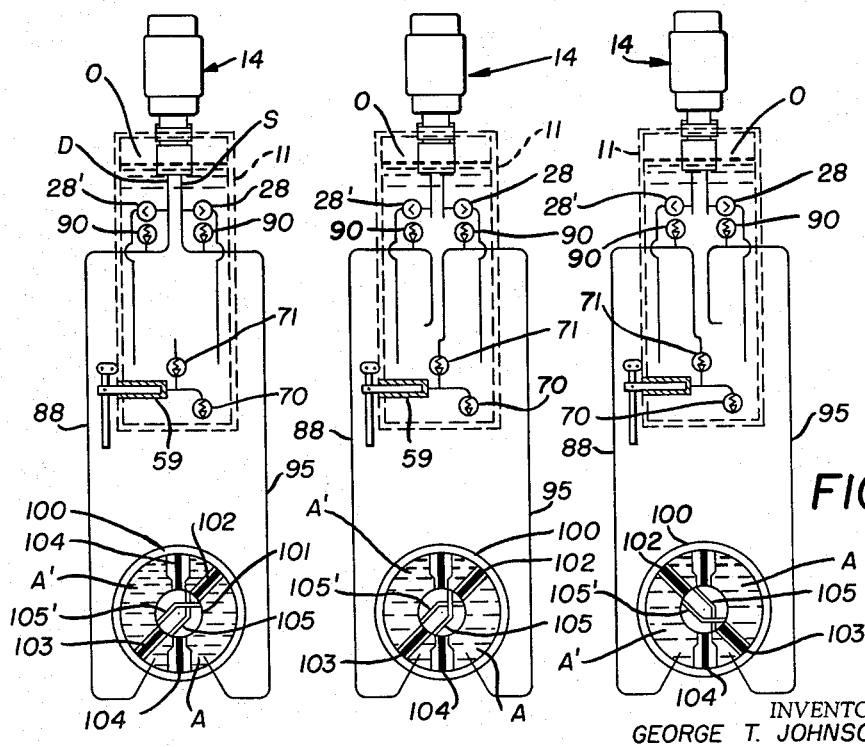
FIG. 3 is a schematic view of the improved apparatus connected to a hydraulic motor valve operator for automatic motor drive actuation thereof.
FIG. 4 is a similar schematic view with the apparatus connected for hand pump opening.
FIG. 5 is a similar view with the apparatus connected for hand pump closing.

The operation of the apparatus, according to the present invention, may be understood with reference to the schematic hydraulic circuitry of FIGS. 3–5.

FIG. 3 displays the hydraulic connection effected by the multi-way valve 27 in the "automatic" position for operation of the hydraulic motor 100. The motor shown is a rotary operator type having a rotor 101, moving vanes 102 and 103, stationary shoes 104, and cross-over paths 105 and 105' through the rotor for balanced torque operation. In the position shown, the rotor 101, which may be keyed to a valve stem has the vanes 102 and 103 extending radially therefrom in a position corresponding to valve-open position. To close the valve, the reversible power-driven pump is actuated so as to create a suction at check valve 28 drawing fluid from the reservoir O within casing 11. The fluid passes through the suction side S of the pump to the discharge side D, through the valve and manifold circuit (bypassing closed check valve 28'), through motor connector 88 and into the pressure side of motor 100 to act against vane 103 and fluid volume A'. The fluid volume A' is displaced through cross-over path 105 to the exhaust side fluid volume A. Pressure also is applied to vane 102 by virtue of the cross-over path 105. Hence, the displaced volumes of fluid A and A' are dispelled through the exhaust side of the motor 100 and conducted back to the suction side of the pump through pump connector 95 and the internal porting of the manifold and valve assembly.

When the motor (and associated valve) is fully closed, flow control valve 91 (in FIG. 2) will sense a pressure build-up and substantially choke off the flow of fluid; and the relief valve 90 will be wide-open, discharging fluid into the reservoir. Also, the motor excitation is preferably timed or controlled by limit switches to shut off after closure of the operated valve. Subsequently, the valve may be opened by reversing the power pump 14. Additional advantageous features are provided by the spring-loaded relief valves 90, which discharge into the reservoir O under over-pressure conditions, and the check valves 28 and 28', which render the pump 14 self-priming.

FIG. 4 shows the selective hydraulic connection effected by the multi-way valve 27 in position for opening the valve operator 100 with the hand piston pump 59. During the suction stroke of pump 59, fluid is drawn into the pump from the reservoir O through ball check 70 and kept within the pump by ball check 71. During the compression stroke of the pump 59, the fluid is then sent through ball check 71 into the previously described hydraulic circuitry with ball check 70, preventing direct return of the fluid to the reservoir O. The reverse connection effected by the multi-way valve 27 for manual closing is shown in FIG. 5 and will be understood with reference to the foregoing discussion of operation.

It is, therefore, clear that the several objects of the invention may be achieved with the apparatus disclosed in the above specification and defined by the appended claims.

What is claimed is:

1. A manual and motor drive apparatus for selectively operating a hydraulic motor having pressure and exhaust connections comprising;

a casing having first and second ends and adapted to form a fluid reservoir, a reversible power-driven pump carried on said first end of said casing, manifold means having an integral hand-driven piston pump mounted on and forming said second end of said casing and having fluid outlet means adapted for connection to a hydraulic motor, operatively connected check and multi-way valve means within said casing in operative communication with said reservoir, said check and multi-way valve means being hydraulically connected with said power-driven pump and said manifold means, and selectively positionable porting means within said multi-way valve means whereby said hydraulic motor may be selectively connected with said power-driven pump and said hand-driven pump and whereby said hydraulic motor may be selectively reversed.

2. A manual and motor drive apparatus for selectively operating a hydraulic motor having pressure and exhaust connections comprising, a casing having first and second ends and adapted to form a fluid reservoir, a reversible power-driven pump carried on said first end, check valve assemblies within said casing and adapted to be immersed in operative communication with said fluid reservoir, fluid-flow means connecting the pressure and suction sides of said power-driven pump with said check valve assemblies for selectively connecting one or both sides of said pump to said reservoir, manifold means having an integral hand-driven piston pump mounted thereon and forming said second end of said casing and having fluid outlet means adapted for connection to the pressure and exhaust sides of a hydraulic motor, and a multi-way control valve operatively carried on and hydraulically connected to said manifold means within said casing, said control valve being operatively connected to said check valve assemblies and adapted for selectively connecting the pressure and exhaust connections of said hydraulic motor with said power-driven pump and with said hand-driven pump and for selectively reversing said hydraulic motor.

3. A manual and motor drive apparatus for selectively operating a hydraulic motor having pressure and exhaust connections comprising, a casing having first and second ends and adapted to contain a fluid reservoir, a reversible power-driven pump mounted on and enclosing said first end, conduits within said casing connected at one end to the pressure and suction sides of said power-driven pump, check valve assemblies connected at the other end of said conduits and adapted to be immersed in operative communication with said fluid reservoir for selectively connecting one or both conduits to said reservoir, a hand-driven piston pump and integral manifold block mounted on and enclosing said second end of said casing, said manifold block having pressure and suction passageways for said hand-driven pump and separate outlet pressure and suction ports adapted for connection to the pressure and exhaust sides of a hydraulic motor, and a multi-way control valve operatively carried on said manifold block within said casing, said control valve being operatively connected to said check valve assemblies and adapted for selectively connecting the pressure and exhaust connections of said hydraulic motor with said power-driven pump and with said hand-driven pump.

4. A manual and motor drive apparatus for selectively operating a hydraulic motor having pressure and exhaust connections comprising, a casing having first and second ends and adapted to form a fluid reservoir, a reversible power-driven pump carried on said first end, check valve assemblies within said casing and adapted to be immersed in operative communication with said fluid reservoir, fluid flow means connecting the pressure and suction sides of said power-driven pump with said check valve assemblies for selectively connecting one or both sides of said pump to said reservoir, manifold means having an integral hand-driven piston pump mounted thereon and forming said second end of said casing and having fluid outlet means adapted for connection to the pressure and exhaust sides of a hydraulic motor, pressure relief valve means mounted in said fluid outlet means and adapted for discharge of fluid from said fluid outlet means into said fluid reservoir under overpressure conditions, and a multi-way control valve operatively carried on and hydraulically connected to said manifold means within said casing, said control valve being operatively connected to said check valve assemblies and adapted for selectively connecting the pressure and exhaust connections of said hydraulic motor with said power-driven pump and with said hand-driven pump and for selectively reversing said hydraulic motor.

5. In combination, a power-driven pump and casing assembly and a manifold block forming one end of said assembly, said manifold block adapted to rotatably carry a multi-way control valve thereon and within said casing, two ball check assemblies at one end of said manifold block for operatively connecting a hand-actuated piston pump block thereto in close fit relation, first conduit bore and port means in said manifold block leading from one of said ball check assemblies and emerging from said manifold block for operatively communicating with a fluid reservoir within said casing, second conduit bore and port means in said manifold block leading from the other of said ball check assemblies and emerging from said block for operative connection with said multi-way control valve, and outlet conduit and port means within said manifold block and adapted for connecting said multi-way control valve with the pressure and exhaust sides of a hydraulic motor.

References Cited in the file of this patent
UNITED STATES PATENTS

| | | |
|---|---|---|
| 1,616,841 | Beebe | Feb. 8, 1927 |
| 2,791,093 | Shafer | May 7, 1957 |
| 2,811,834 | Shafer et al. | Nov. 5, 1957 |
| 3,069,855 | Denkowski et al. | Dec. 25, 1962 |